Figure 1:
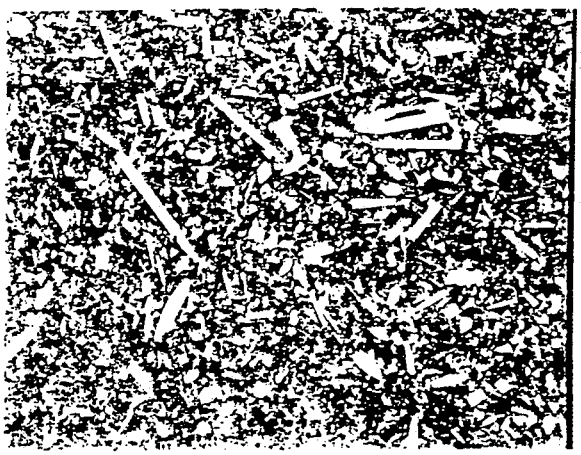

United States Patent [19]

Brandt et al.

[11] Patent Number: 4,867,761
[45] Date of Patent: Sep. 19, 1989

[54] CERAMIC CUTTING TOOL REINFORCED BY WHISKERS

[75] Inventors: Nils G. L. Brandt, Solna; Zeljka D. Senesan, Stockholm, both of Sweden

[73] Assignee: Sandvik AB, Sandviken, Sweden

[21] Appl. No.: 170,343

[22] Filed: Mar. 18, 1988

[30] Foreign Application Priority Data

Mar. 20, 1987 [SE] Sweden .............................. 8701172

[51] Int. Cl.$^4$ ...................... C04B 35/10; C04B 35/56; C04B 35/58; C04B 35/80
[52] U.S. Cl. ........................................ 51/309; 501/87; 501/89; 501/91; 501/92; 501/95; 501/127; 501/153
[58] Field of Search ...................... 51/309; 501/87, 89, 501/91, 92, 95, 127, 153

[56] References Cited

U.S. PATENT DOCUMENTS 4,343,909  8/1982  Adams et al. ......................... 51/309
4,767,727  8/1988  Claussen et al. ...................... 501/88
4,789,277  12/1988  Rhodes et al. ........................ 51/309

Primary Examiner—Mark L. Bell
Attorney, Agent, or Firm—Burns, Doane, Swecker & Mathis

[57] ABSTRACT

The present invention relates to a ceramic cutting insert containing whiskers for chip forming machining of steel and having improved mechanical, thermal and wear properties. The insert comprises besides the oxide-based matrix 5–50% by volume, preferably 10–40% by volume, of homogeneously dispersed whiskers of carbides, nitrides and/or borides of titanium and/or zirconium and, where applicable, solid solutions thereof. A part of the whiskers may be replaced by whiskers of silicon carbide. The properties of the composite material can be further modified by coating the whisker material with thin layers. The whiskers reinforced cutting material shows an improved toughness behaviour and resistance to thermal crack formation without having a negative influence on the wear resistance to any appreciable extent.

3 Claims, 1 Drawing Sheet

300x

300x

CERAMIC CUTTING TOOL REINFORCED BY WHISKERS

The present invention relates to ceramic cutting tool materials and, in particular, to such cutting materials in which monocrystalline whiskers (hair crystals) based upon titanium are homogenously distributed in a ceramic matrix containing aluminium oxide which leads to an improved strength and toughness without having a negative influence on the wear resistance to any appreciable extent.

Ceramic cutting tools have now been available for several decades but not until the last ten years they have got a commercial importance for use in chip forming machining. The main reason for the limited increase of ceramic cutting tools has been sudden and unexpected cutting insert failures because of inadequate strength and toughness.

During the last ten years the properties of ceramic cutting materials have been improved in many respects why they have increased their relative share in cutting of cast iron and (nickel-base) alloys with high heat resistance. In cutting of steel, which is the completely dominating workpiece material, the share of the cutting inserts being ceramic is still very modest because said workpiece material makes extreme simultaneous demands upon strength, toughness and wear resistance which have not been possible to fulfil by known ceramic cutting tool materials.

Aluminium oxide based cutting tools are very sensitive to thermal cracking as aluminium oxide in itself has a relatively low thermal conductivity. This fact leads to a very short life in steel particularly under conditions having short engagement times and varying cutting depths.

To a certain extent the thermal properties have been improved by an addition of titanium carbide and/or titanium nitride which improves the thermal conductivity of the composite material. The addition of titanium carbide/nitride also increases the hardness of the material. In comparison with pure aluminium oxide materials an increased life is therefore obtained in cutting of hard workpiece materials and in operations demanding resistance to thermal shocks. This type of material has, however, too poor a toughness behaviour for a general use in cutting of steel.

Another, later step of development includes addition of homogenously dispersed fine-grained zirconium oxide particles in a matrix of aluminium oxide. A transformation of the "metastable" zirconium oxide particles at the use increases both strength and toughness and will, thus, lead to a more predictable life.

The thermal properties of said kind of material are, however, insignificantly better than those of pure aluminium oxide materials why initiation and growth of thermally induced cracks still are great problems in practical cutting operations generating high cutting edge temperatures such as machining of steel.

It has recently been shown that alloying with SiC-whiskers, monocrystalline hair crystals, in a matrix of aluminium oxide leads to a greatly improved fracture toughness and strength. Ceramic cutting materials based upon this concept have proved very good performance in cutting of materials with high heat strength, in particular, but in cutting of steel they have shown surprisingly short tool lives if the SiC-whisker loading is higher than about 10% by volume because of preferential attacks of the SiC-crystals leading to a weakening of the surface zone with accompanying high wear and risks of initiation of fractures. (See e.g. EP-A2-0 194 811).

It is, thus, a purpose of the invention to obtain a ceramic material for chip forming machining of steel, in particular, where the above mentioned weaknesses of the known aluminium-oxide-based cutting materials have been eliminated. In materials according to the invention there is, thus, a unique combination of strength, toughness, thermal shock resistance and wear resistance, which has not been possible to obtain by earlier known oxide-based cutting materials.

The primary aim of the present invention is to make oxide-based ceramic cutting materials reinforced by whiskers having a low solubility in steel resulting in that the cutting material obtains an improved and more predictable toughness, strength and thermal shock resistance without appreciably deteriorating the wear resistance in cutting of steel, in particular, which has not been possible by earlier known material compositions.

The ceramic cutting material according to the present invention comprises an oxide-based, preferably aluminium oxide-based, matrix with 5–50, preferably 10–40, especially 25–35% by volume homogeneously dispersed whiskers based upon carbides, nitrides and/or borides of titanium and/or zirconium or in applicable cases solid solutions thereof, preferably titanium nitride. Said whiskers consist of monocrystals with a diameter of 0.5–10 $\mu$m and a length of 2.5–100 $\mu$m characterised thereof that the length/diameter ratio preferably is 5–10. The grain size of the oxide matrix shall be <10 $\mu$m, preferably <4 $\mu$m. The oxide matrix shall consist of essentially ceramic oxides or of ceramic oxides mixed with hard carbides and/or nitrides and/or borides and/or binder metal. Preferably, the ceramic matrix shall contain <20% preferably <15% by weight $ZrO_2$.

A part of, less than 50%, the above mentioned whiskers may be replaced by silicon carbide whiskers which have a favourable influence on the thermal shock resistance without notably reducing the wear resistance when machining steel under the condition that the total amount of SiC whiskers shall not exceed 15% by volume.

Figure 2:
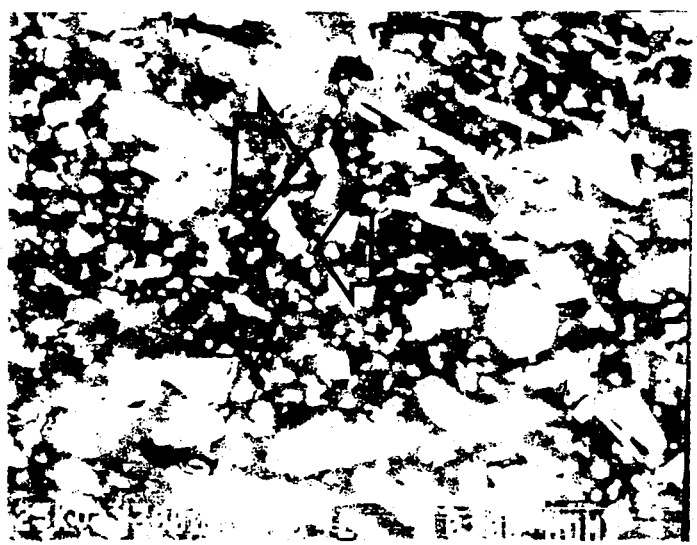

The invention is illustrated by FIGS. 1 and 2 which are SEM photos of the structure of a material according to the invention (Example 1). FIG. 1 shows the structure in 300 x magnification and FIG. 2 shows in 3000 x magnification crack deflection in the structure.

The cutting material in question is made by wet milling and mixing of oxide-based powder and monocrystalline whisker crystals. After drying the mixture is pressed to desired geometrical form and sintered without pressure to near theoretical density. After the sintering the possible remaining so called closed porosity can be removed by a hot isostatic pressing. If it is not possible by sintering to obtain a closed porosity the material can be pressure sintered by a suitable graphite tool or after encapsulating be hot isostatically pressed to desired density. The sintering method is depending upon the whisker material and is chosen so that the cutting material reaches a density which exceeds 99% of the theoretical density. In the preferred form of embodiment the whisker material consists of titanium nitride and the matrix is aluminium oxide-based, which allows pressureless sintering up to 40% by volume of whiskers. Materials containing titanium carbide- or titanium diboride-whiskers cannot be sintered pressurelessly at whisker contents above 10% by volume.

Use of whisker reinforcement in the aluminium oxide-based matrix leads to a significant increase of the fracture strength. The mechanisms which cause said increase can be load transfer between whisker and matrix, crack deflection (at arrows in FIG. 2) and whisker pull out. These mechanisms utilise and are dependent upon the crack propagation taking place along a sufficiently weak boundary surface between whisker and matrix. The bonding strength between whisker and matrix is therefore an important parameter which can be influenced by coating of the whisker material with thin layers in order to further improve the fracture toughness.

In order to further illustrate the invention there are given examples below concerning manufacturing and properties of whisker-reinforced cutting materials according to the invention. The whisker material being used in the examples has been prepared by CVD-technique but it is obvious to a person skilled in the art that similar results can be obtained by alternative methods of producing the whiskers.

EXAMPLE 1

Titanium nitride whiskers were made in a CVD-reactor by coating of nickel sponge from a gaseous mixture of $TiCl_4$, $N_2$ and $H_2$ at a temperature of about 1200° C. The whisker crystals were removed from the nickel substrate by ultrasonic treatment and mechanical brushing in an acetone bath. The main part of the crystals had a diameter of 0.5-2 μm and a length of 20-100 μm.

30% by volume of titanium nitride whiskers were wet-mixed with 70% by volume of a mixture of 95.5% $Al_2O_3$, 4.2% $ZrO_2$ and 0.3 % MgO (all by weight). After drying in vacuum the mixture was dry-mixed and pressed to blanks SNGN 120412. The blanks were sintered at 1550° o.C in nitrogen gas to 99% of theoretical density.

The fracture toughness ($K_{IC}$) was measured by means of the so called indentation method. An impression is made with the aid of a pyramid shaped diamond indenter and $K_{IC}$ is calculated from the length of the cracks which are induced from the corners of the indenter.

Two references were used at the measurement on one hand $Al_2O_3$+4.2% by weight $ZrO_2$+0.3% by weight MgO and on the other $Al_2O_3$+4.2% by weight $ZrO_2$+0.3% by weight MgO+30% by volume TiN-particles. In the latter case the titanium nitride addition consisted of grains with equal axes.

The result of the $K_{IC}$ determination is shown in table 1.

TABLE 1

| | $K_{IC}$ |
|---|---|
| 1. $Al_2O_3$ + 4.2% by weight $ZrO_2$ + 0.3% by weight MgO + 30% by volume TiN (whiskers) | 6.1 |
| 2. $Al_2O_3$ + 4.2% by weight $ZrO_2$ + 0.3% by weight MgO + 30% by volume TiN (particles) | 3.9 |
| 3. $Al_2O_3$ + 4.2% by weight $ZrO_2$ + 0.3% by weight MgO | 4.0 |

It is obvious from the table that incorporation of TiN whiskers has given a significant increase of the fracture toughness. The fracture toughness is a parameter which shows the ability of a material to resist mechanical stresses without catastrophic failure. In the case of chip forming machining it means that higher feeds can be allowed, i.e. the rate of the material removal can be increased for a given cutting speed.

EXAMPLE 2

Cutting inserts SNGN 120412 were manufactured from 3 powder mixtures according to table 1 and were tested by continuous turning of steel SS 2541. The cutting speed was 450 m/min, the cutting depth 2 mm and the feed 0.36 mm $rev^{-1}$.

| Result | Life, min |
|---|---|
| 1. | 16[1] |
| 2. | 10[2] |
| 3. | 3[3] |

[1]The life was determined by crater wear and flank wear.
[2]The life was determined by mechanical failure because of wear with accompanying weakening of the cutting edge.
[3]The life was determined by thermal crack formation.

We claim:
1. Oxide-based ceramic cutting insert for chip forming machining of steel characterized in that said insert consists essentially of a matrix of aluminum oxide and <20% by volume of $ZrO_2$ and 5-50% by volume of homogeneously dispersed whiskers of carbides, nitrides and/or borides of titanium and/or zirconium and solid solutions thereof.

2. Cutting insert according to claim 1, characterized in, that up to 50% of the whiskers is exchanged by SiC whiskers, the total amount of SiC whiskers being <15% by volume.

3. Oxide-based ceramic cutting insert according to claim 1, wherein said homogeneously dispersed whiskers are present in an amount of 10 to 40% by volume.

* * * * *